May 11, 1965  R. GENTILE  3,182,340
FLOAT
Filed April 9, 1962  2 Sheets-Sheet 1
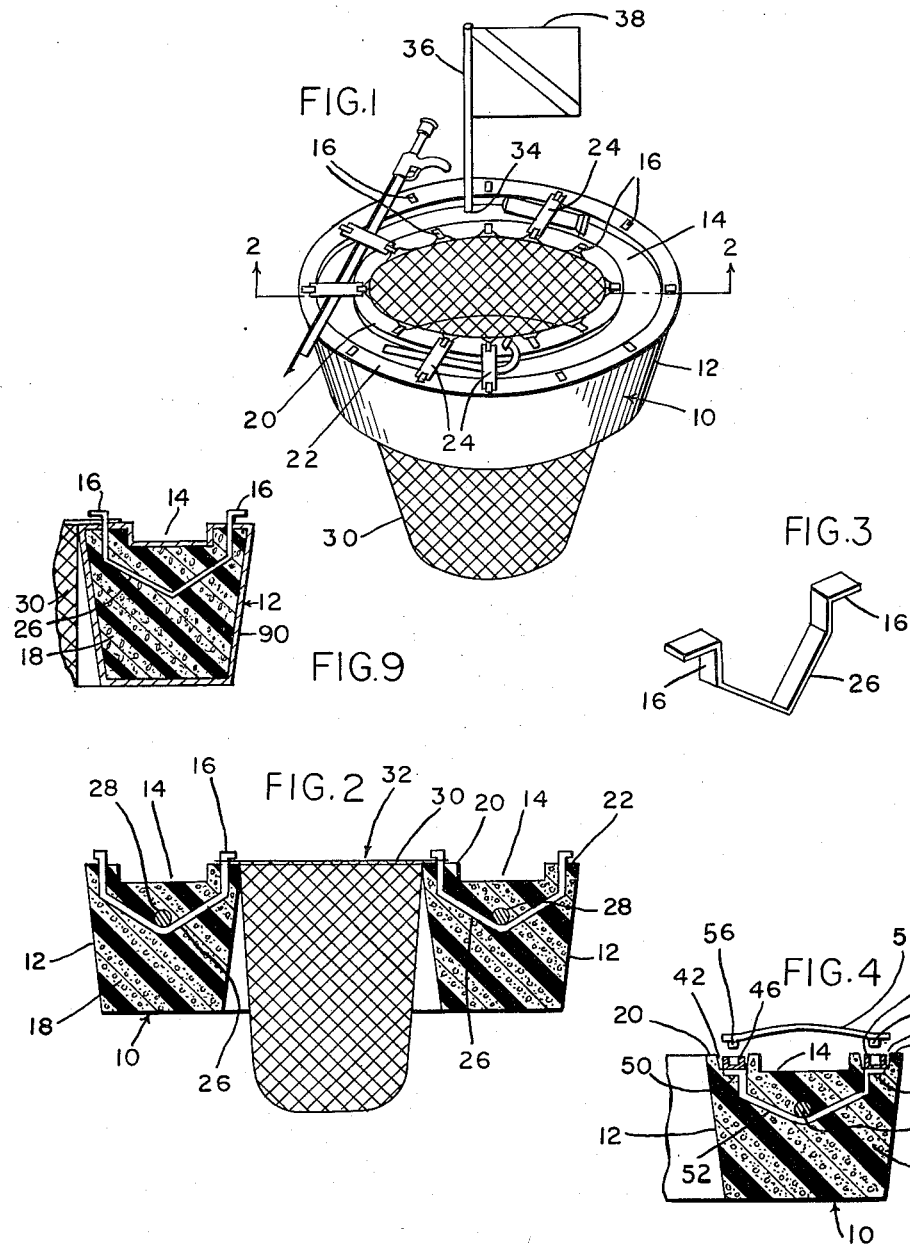
INVENTOR.
ROBERT GENTILE
BY Wilfred Baranick
ATTORNEY May 11, 1965  R. GENTILE  3,182,340
FLOAT
Filed April 9, 1962  2 Sheets-Sheet 2

INVENTOR.
Robert Gentile
BY Wilfred J. Baramick
ATTORNEY

United States Patent Office 3,182,340
Patented May 11, 1965

3,182,340
FLOAT
Robert Gentile, Woburn, Mass., assignor to Sea-All, Inc., Billerica, Mass., a corporation of Massachusetts
Filed Apr. 9, 1962, Ser. No. 185,982
6 Claims. (Cl. 9—8)

This invention relates to floats and more particularly to floats for use in skindiving, lifesaving and the like.

A principle object of the present invention is to provide a float on which articles or objects such as skindiving or lifesaving equipment can be carried without the danger of falling therefrom.

Another object of the invention is to provide a float which will not sink even when punctured.

Another object of the invention is to provide a float comprising a cellular plastic material having a construction which is strong and durable and which will firmly retain or secure suitable fastening means carried thereby.

Still another object of the invention is to provide a float which is of simple but rugged construction and of reasonable cost.

Other objects of the invention will in part be obvious and will in part appear hereinafter.

The invention accordingly comprises the floats possessing the construction, combination of elements and arrangements of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is an isometric view of one float of the present invention;

FIG. 2 is a cross-sectional view of the float illustrated in FIGURE 1 taken along the line 2—2;

FIG. 3 is an enlarged view of the fastening means utilized in the float of FIG. 1;

FIG. 4 is a cross-sectional view of the float illustrating another means for fastening articles to the float;

FIG. 9 is a cross-sectional fragmentary view of a float illustrating another embodiment of the invention.

Figure 5:
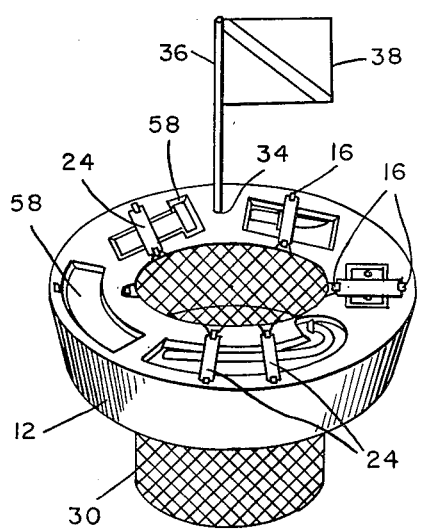
FIG. 5 is an isometric view of another float of the invention.

Floats for use in skindiving or the like are well known. However, such heretofore known floats have been found to possess one or more deficiencies. For example, there is utilized in skindiving, floats having buoyant elements which when punctured by a knife, spear gun or the like result in the float sinking. Inflated rubber tubes are floats of this nature. The sinking of such inflated floats by the accidental puncturing thereof will leave the diver without a resting station as well as without visible means for observers or for warning surface craft of his presence. Moreover, the diver may lose articles carried thereby.

Another deficiency resides in that many heretofore known floats are of a construction which makes it difficult to carry or secure articles thereto. The skindiver, for instance, is limited in the amount of equipment he can carry on his person. Thus, it is often desirable to carry some equipment or accessories, e.g., flashlight, camera, extra tank of oxygen, extra weights, etc., on his float so that it is readily available. With inflated rubber tubes it is usually necessary to tie equipment, flags etc. thereto. Thus, it is often difficult to secure and to remove the equipment therefrom, particularly when bulky gloves are being worn. Other floats have been described which provide tray means for holding articles. However, the articles are not secured therein. Thus there is always the danger of the float being upset and the articles thrown into the water and possibly lost.

Inflated rubber floats also are undesirable in that the diver must usually wrap his arm therearound in order to be adequately supported thereby. Such floats are difficult to grasp quickly and securely which is often necessary in times of emergency. Preferably, the float should be of a construction which permits the diver to firmly and securely grasp it with his hands even when wearing bulky gloves.

It has been proposed to utilize unsinkable floats comprising a cellular plastic material, eg., a foamed or expanded synthetic resin such as polyurethane. Many of such cellular floats lack sufficient strength and rigidity so that after only little use they often crumble or break up. Moreover, the cellular material by itself generally does not provide a good base or anchoring medium for fastening means which may be carried thereby to secure articles thereto. Thus, after some use the fastening means may become dislodged from the cellular material.

In the present invention there is provided a safe, unsinkable, rugged float comprising a cellular plastic structure which is suitably internally reinforced to provide additional strength and rigidity thereto, thus providing for long life. The internal reinforcing means also aids in retaining the fastening means within the cellular plastic material so that even after repeated use the fastening means do not become removed from the float. The fastening means employed permit articles to be easily attached and released from the float even when bulky gloves are worn. Moreover, even if the float is upset, the articles thereon will not be thrown into the water and possibly lost, since they will be securely fastened to the unsinkable float. Furthermore, the present invention also provides a float which can be quickly and firmly grasped by the hands to support a person even when the person is wearing bulky gloves.

Referring now to FIGURES 1 and 2, there is shown a float 10 comprising an annular or ring-shaped frame or body 12 of appreciable depth having an annular recess or groove 14 in the top surface thereof and a plurality of fastening means 16 spaced around the groove 14. The float body 12, shown as having a tapered lower end or bottom, is preferably formed of a cellular plastic material 18 having substantial rigidity, low water absorption, good buoyancy characteristics and an appreciable resistance to oil and gasoline. In one preferred embodiment, the body 12 comprises cellular or foamed polyurethane. In addition to polyurethane, other suitable foamed or expanded synthetic resins or plastics may also be utilized to form a cellular float body which is unsinkable even when punctured. Mention may be made of foamed vinyls such as, for example, foamed polyvinyl chloride, foamed or expanded polystyrene, cellular polyolefins such as polyethylene and polypropylene, polyepoxide foams, cellular cellulose acetate and the like.

Coloring material such as a dye or pigment is preferably added to or incorporated in the cellular plastic material so as to impart thereto properties which will facilitate the location of the float during the daytime and/or nighttime. The float body may thus have, for example, an orange, red or yellow color to provide easy visual spotting during the daytime. Colorants which provide fluorescence or the like may also be incorporated in the float body 12 so that its visual location during darkness may be facilitated.

In the upper or top surface of float body 12, there is preferably provided a single, substantially centrally disposed groove 14 which completely encircles the float body and which defines a container for articles. Groove 14 has an inner circumferential wall portion 20 and an outer circumferential wall portion 22. The annular groove 14 is of an appreciable width so that many of the articles or objects sought to be carried by the float can be placed and secured therein such as shown. The depth of the groove 14 is such that the articles placed or contained therein will be firmly held or secured by the fastening means provided. The depth of the groove 14 is also sufficient so that the outer circumferential wall portion 22 provides a hand hold which can be grasped easily and firmly by hand even when bulky gloves are worn.

A plurality of fastening means 16 are predeterminedly spaced around the annular groove 14 and hence the top surface of the float body 12. As shown, a plurality of spaced fastening means 16 extend from and are carried above opposed groove wall portions 20 and 22 thus forming an inner circumferential ring of spaced fastening means and an outer circumferential ring of spaced fastening means. Preferably the fastening means carried by the inner wall portion 20 and the fastening means carried by the outer wall portion 22 are in substantial alignment with each other thus forming pairs of directly opposed fastening means which bracket the groove 14.

The fastening means 16 which may be formed of any suitable material, e.g., metal, rigid plastic, etc., comprise narrow hook-like elements which preferably face away from the groove 14. In one preferred embodiment, the fastening means 16 comprise outwardly extending right angle bends. The hook-like elements permit flexible or elastic means such as elastic rubber bands 24 to be quickly and easily hooked on and released therefrom. Articles to be secured to the float, regardless of their shape, are firmly held between the fastening means by hooking one or more elastic bands to the fastening means such that the article or articles are suitably and securely carried thereunder. FIGURE 1 illustrates several ways in which articles may be secured by elastic bands 24 between fastening means carried by opposite groove wall portions 20 and 22.

To help to firmly anchor the fastening means 16 in the float body 12 comprising a cellular plastic material 18, each fastening means carried by the inner wall portion 20 is connected by means of an embedded narrow brace member 26 to a fastening means carried by the outer wall portion 22. As shown more clearly in FIGS. 2 and 3, preferably directly opposed pairs of fastening means are interconnected by a substantially V-shaped brace member 26 which is firmly embedded in the cellular float body 12. Instead of being V-shaped, the brace or connecting members 26 may be substantially U-shaped or the like. The brace members may be formed of any suitable material, e.g., metal, rigid plastic, etc. Preferably each brace member and fastening means joined thereto is of single piece metallic construction such as shown.

A reinforcing ring 28 of, for example, stainless steel, is internally embedded in the cellular float body 12. The reinforcing ring 28 is positioned within the brace member 26 and preferably adjacent the bottom thereof. The internal reinforcing ring 28 may be suitably secured to each brace member 28 or it may merely be positioned adjacent the inner bottom portion of each brace member without being secured thereto.

The reinforcing ring 28 which is internally embedded in the float body 12 may have a cross section other than that shown. For example, instead of the substantially circular cross-section illustrated, the ring may also have a rectangular or square cross-section, tubular cross-section or the like. The reinforcing ring 28 may be formed of a number of materials. For example, the ring may be metallic, e.g., stainless steel, aluminum or the like, or it may be of wood, or of a synthetic resin or plastic or other suitable material. When a plastic material is utilized as the reinforcing ring, it is of a structure other than that of the float body, that is, the reinforcing ring does not possess a foamed or cellular structure. The reinforcing ring 28 provides additional strength and rigidity to the cellular float body 12. Moreover, being internally embedded completely around the float body 12 within the plurality of substantially V or U-shaped brace members 26 and adjacent the bottom thereof, the reinforcing ring 28 also provides an additional means for helping to firmly retain the fastening means 16 in place and to prevent them from being pulled out from the float body 12.

A suitable net 30 may be secured about its mouth to a plurality of fastening means carried by the inner wall portion 20 and carried within the annulus 32 of the float. The net is preferably of a depth such that an appreciable portion of the lower end thereof is adapted to extend well below the surface of the water thus providing a suitable carrying space for live shell fish, freshly caught fish or the like.

An opening or hole 34 may also be provided in the top surface of the float body in which a staff member 36 carrying a flag or pennant 38 of suitable size and coloring may be inserted. The pennant helps the skindiver to quickly relocate his float, aids observers in keeping the float in view and provides a means to warn surface craft of the presence of a float and a skindiver.

Referring now to FIG. 4 where like members refer to like elements of FIGURE 1, there is shown a structure similar to that illustrated in FIGURE 1 except that different fastening means are provided to secure articles to the float. In this instance, there is provided a plurality of cavities 40 and 42 spaced around the groove 14, the cavities containing therewithin snap fastener elements 44 and 46 respectively. A plurality of cavities 40 containing snap fastener elements 44 therein are carried by inner wall portion 20 and spaced completely therearound while a plurality of cavities 42 containing snap fastener elements 46 therein are carried by outer wall portion 22 and also spaced completely therearound thus forming an inner circumferential ring of spaced snap fastener elements and an outer circumferential ring of spaced snap fastener elements. The cavities 40 and snap fastener elements 44 carried by the inner wall portion 20 and the cavities 42 and snap fastener elements 46 carried by the outer wall portion 22 are in substantial alignment with each other thus forming pairs of directly opposed cavities and snap fastener elements. The snap fastener elements 44 and 46 are securely attached by suitable means such as by rivets, bolts or the like, to tab or bracket means 48 and 50 respectively which are positioned adjacent the snap fastener elements and embedded in the float body 12. The tab means 48 connected to the snap fastener elements 44 are connected by means of a substantially V or U-shaped brace member 52 to the tab means 50 connected to the snap fastener elements 46. Preferably the pair of tabs joining directly opposed pairs of snap fastener elements are joined together by the brace member 52. The tabs and brace member preferably comprise a narrow unitary structure as shown and may be formed of any suitable material such as of metal, rigid plastic, etc.

Articles are quickly and easily secured and released from the float by providing a fastening strip element 54 having a pair of predeterminedly spaced snap fastener elements 56 secured thereto which coact or cooperate wtih the snap fastener elements 44 and 46 carried by the float body 12. The strip element 54 may comprise a flexible or elastic material, e.g., leather, rubber or the like or it may be of a rigid structure, e.g., metal, rigid plastic or the like. The snap fastener elements 44 and 46 carried by the float body 12 and those, 56, carried by the strip element comprise coacting male and female parts, one part being carried by the float body and the other part being carried by the strip element 54. To secure an article to the float, the article is preferably placed between the snap fastener elements 44 and 46 and the pair of snap fastener elements 56 carried by the strip element 54 are then snapped into contact with appropriate snap fastener elements 44 and 46 such that the article is suitably carried and secured under the strip element. More than one strip element may be used to secure the article. The article is released merely by pulling the strip element or elements securing the article so as to release the coacting snap fastener elements.

Referring now to FIG. 5 wherein like members refer to like elements of FIGURE 1, there is shown a structure similar to that illustrated in FIGURE 1 except that instead of a single, continuous annular groove 14, there is provided a plurality of grooves 58 around the top surface of the float body 12. In one embodiment, one or more of the grooves may have the general shape or contour of the particular article to be placed and carried therein. Thus, for example, one groove is shown in FIG. 5 as having a shape to accommodate a flashlight therein, another groove is shaped to receive a weight, etc.

Figure 6:
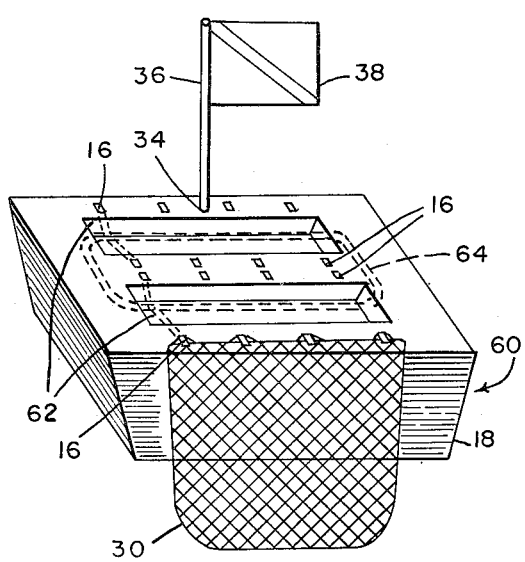
FIG. 6 is an isometric view of still another float of the invention.

In addition to a ring-shaped float, the invention is also applicable to floats having other shapes or structures, e.g., rectangular, square, etc. In FIG. 6, wherein like members refer to like elements of FIGURE 1, there is shown a solid rectangular float 60 having a pair of aligned longitudinal grooves 62 in the top surface thereof around which extend fastening means such as described in connection with FIGURE 1. Obviously the float may be provided with only one groove or a plurality of grooves. The fastening means are joined together by brace members (a representative pair being shown by dotted lines) such as heretofore described. A reinforcing member 64 shown in dotted lines as an enclosed rectangular structure is also provided. This member is utilized in the same manner as reinforcing ring 28 described above. In this embodiment, the net 30 is suitably secured to fastening means carried by one side of the float.

Figure 7:
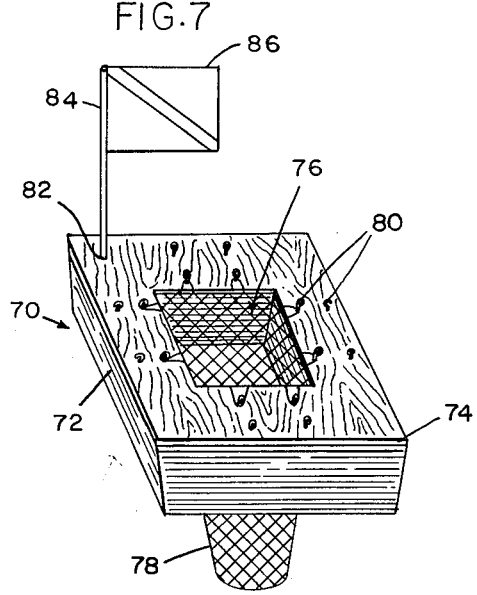
FIG. 7 is an isometric view of another embodiment of the invention.
Figure 8:
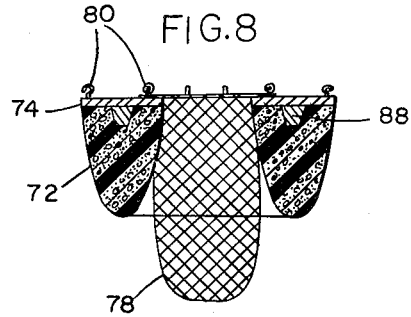
FIG. 8 is a cross-sectional view of the float illustrated in FIG. 7 taken along the line 8—8.

Referring now to FIGS. 7 and 8, there is shown a float 70 comprising a float body 72 of appreciable depth having a flush deck or flooring 74 secured to the top surface thereof. An opening or hole 76, preferably substantially centrally disposed as illustrated, is provided in float 70 to accommodate net 78. As shown, the opening 76 extends completely through the deck 74 and float body 72. A plurality of fastening means 80 are predeterminedly spaced about the upper surface of the float 70.

The float body 72, shown as having a tapered lower end or bottom, is formed of a cellular plastic material, as hereinbefore described. The deck or flooring 74 which is secured or bonded to the top surface of the float body 72 can be formed of wood, e.g., marine plywood, a suitable rigid plastic or the like. The deck 74 may be bonded to the float body 72 by means of, for example, a suitable water resistant adhesive. The float body 72 and deck 74 can be colored as heretofore mentioned so as to facilitate the visual location of the float.

Around the top of the deck 74 and hence around the top of the float 70, there is provided a plurality of predeterminedly spaced fastening means 80. As shown, fastening means 80 are spaced around and adjacent opening 76 and around the outer edge portions of deck 74 thus forming an inner ring of fastening means and an outer ring of fastening means, the rings being suitably spaced from one another. Preferably the fastening means of the inner and outer rings are in substantial alignment with each other thus forming pairs of directly opposed fastening means. Deck 74 provides a positive means for firmly retaining or holding the fastening means 80 in place.

The fastening means 80 which may be formed of any suitable material, e.g., metal, preferably comprise hook-like elements. The fastening means 80 may be screwed into the deck 74 consisting of, for example, marine plywood and float body 72 and thus firmly held thereby or they may be passed through the deck 74 and firmly held by the back or underside thereof by the use of nuts or other suitable securing means. The fastening means may comprise hooks, eye hooks or the like. In the drawings, the inner ring of fastening means is illustrated as being eye hooks while the outer ring of fastening means is shown as being open hooks. Articles, regardless of their shape, to be secured to the float 70, are firmly held between the fastening means 80 by hooking one or more elastic bands as shown, for example, in FIGURE 1, to the fastening means so that the article or articles are suitably and securely carried thereunder.

A suitable net 78 may be secured about its mouth to a plurality of fastening means located adjacent opening 76 and carried within the opening 76 such as shown. The opening 76 may have a shape other than that shown. For example, opening 76 may be circular or the like.

A staff support means 82 may also be provided in the top surface of the float 70 in which a staff member 84 carrying a flag or pennant 86 as hereinbefore described may be supported. For example, the support means may comprise an opening or hole in the deck 74 as shown or a suitable holder secured to the deck.

A reinforcing ring or member 88 of, for example, wood, rigid plastic, metal or the like is internally embedded in the cellular float body 72. The reinforcing member 88 extends completely around the float 70 and, as shown, is preferably embedded so as to be at or adjacent the upper or top surface of the float body 72. The embedded reinforcing member 88 may have a cross section other than that shown. For example, instead of the wedge shape illustrated, the member may also have a rectangular or square cross-section, circular cross-section or the like. The reinforcing member 88 provides additional strength and rigidity to the cellular float body 72. Moreover, the reinforcing member also provides a firm base or foundation to which the deck 74 may be secured by, for example, suitable screws, bolts or the like.

In another embodiment of the invention, longer life can be imparted to the various cellular float bodies illustrated and described by suitably encasing or surrounding the cellular float body in a protective casing or enclosure 90 (FIG. 9) of a plastic or polymeric material in non-cellular form; the float body casing having substantially the same shape or configuration as the cellular float body. In other words, the cellular float bodies of the floats heretofore described can be provided with a contour or form-fitting casing comprising a polymeric material in substantially solid form, i.e., of a noncellular nature. Among the many thermosetting and thermoplastic polymeric materials which may be utilized to form the float body casing, mention may be made of, for example, acrylonitrile-butadiene-styrene plastics, acrylics such as polymethylmethacrylate, alkyds, allylics, amino plastics such as melamine-formaldehyde and urea-foramldehyde, cellulosic plastics such as cellulose acetate butyrate, cellulose propionate and the like, polyamide resins, phenolics such as phenol-formaldehyde and the like, polyesters, polyalkylenes such as polyethylene and polypropylene, polystyrene, and vinyl resins such as polyvinyl chloride etc. The plastic float body casing can be suitably colored so as to impart thereto properties which will facilitate the location of the float during the daytime and/or nighttime.

When a non-cellular plastic casing for the cellular float body is employed, it is obvious that the fastening means spaced about the top surface of the float extend above the casing. Likewise, it is obvious that since such a casing substantially conforms to the shape or configuration of the cellular float body, the recesses or grooves, if employed, are preserved or retained. Moreover, it should be mentioned that when such a casing is employed, other embodiments of float 70 shown in FIGS. 7 and 8 are possible. For example, float 70 can comprise a cellular float body 72 completely enclosed in a plastic casing as heretofore mentioned. The deck or flooring 74 in this case thus comprises an integral part of the casing.

Likewise, float 70 can comprise a cellular float body 72 having a deck 74 of, say, marine plywood and having all other sides thereof enclosed or encased in the preferred plastic casing, the deck and casing being suitably secured or bonded together.

It should be mentioned that when a casing comprising a non-cellular plastic material is employed to encase or enclose the cellular plastic material of the float body, the internally embedded reinforcing ring heretofore mentioned may be dispensed with, if desired.

Since certain changes may be made in the above floats without departing from the scope of the invention herein involved, it is intended that all matter contained in the above description or shown in the accompanying drawings shall be interpreted as illustrative and not in a limiting sense.

What is claimed is:

1. A float which comprises a body having a single, substantially centrally disposed opening therethrough, said body comprising a cellular plastic material having a plurality of fastening means spaced about the top surface thereof, some of said fastening means being adjacent to and spaced around said opening to form an inner ring of fastening means, and some of said fastening means being predeterminedly spaced from said inner ring of fastening means to form an outer ring of fastening means, said fastening means of said inner ring and said outer ring being aligned so as to form pairs of directly opposed fastening means, said pairs of opposed fastening means being joined together by a brace member embedded in said body, a reinforcing ring embedded in said body adjacent said brace member, said reinforcing ring extending completely around said body, and at least one groove between said inner and outer rings of fastening means.

2. The float of claim 1 wherein there is provided a single continuous groove which extends completely around the top surface of said body.

3. The float of claim 1 wherein a plurality of grooves are provided around the top surface of said body.

4. The float of claim 1 wherein the cellular body is enclosed in a casing comprising a non-cellular plastic material.

5. A float which comprises a body having a single, substantially centrally disposed opening therethrough, said body comprising a cellular plastic material having a plurality of fastening means spaced about the top surface thereof, some of said fastening means being adjacent to and spaced around said opening to form an inner ring of fastening means, and some of said fastening means being predeterminedly spaced from said inner ring of fastening means to form an outer ring of fastening means, said fastening means of said inner ring and said outer ring being aligned so as to form pairs of directly opposed fastening means, said pairs of opposed fastening means being joined together by a brace member embedded in said body and at least one groove between said inner and outer rings of fastening means.

6. The float of claim 5 wherein the cellular body is enclosed in a casing comprising a non-cellular plastic material.

References Cited by the Examiner
UNITED STATES PATENTS

| | | | |
|---|---|---|---|
| 714,757 | 12/02 | Strakele | 9—11 X |
| 818,183 | 4/06 | Matson | 9—11 |
| 988,830 | 4/11 | Smith | 9—313 |
| 1,206,696 | 11/16 | Gulbrandsen | 9—8 X |
| 1,422,657 | 7/22 | Broady | 9—11 |
| 1,773,029 | 8/30 | Cobham | 9—8 |
| 2,411,202 | 11/46 | Gardner | 9—8 |
| 2,945,468 | 7/60 | Payne | 114—230 |
| 3,007,437 | 11/61 | Adair | 9—9 X |
| 3,011,184 | 12/61 | Curcio | 9—11 |
| 3,095,586 | 7/63 | Baier | 9—340 |

FERGUS S. MIDDLETON, *Primary Examiner.*

MILTON BUCHLER, *Examiner.*